United States Patent
Krug-Kussius

(10) Patent No.: US 7,819,130 B2
(45) Date of Patent: Oct. 26, 2010

(54) METERING ORIFICE ARRANGEMENT FOR A HYDRAULIC CURRENT DIVIDER AND CURRENT ADDING DEVICE

(75) Inventor: Karl Krug-Kussius, Karsbach (DE)

(73) Assignee: Bosch Rexroth AG, Stuttgart (DE)

( * ) Notice: Subject to any disclaimer, the term of this patent is extended or adjusted under 35 U.S.C. 154(b) by 372 days.

(21) Appl. No.: 10/585,874

(22) PCT Filed: Feb. 7, 2005

(86) PCT No.: PCT/EP2005/001217
§ 371 (c)(1), (2), (4) Date: Aug. 3, 2006

(87) PCT Pub. No.: WO2005/075834
PCT Pub. Date: Aug. 18, 2005

(65) Prior Publication Data
US 2007/0175521 A1    Aug. 2, 2007

(30) Foreign Application Priority Data
Feb. 5, 2004 (DE) ..................... 10 2004 005 692
Apr. 22, 2004 (DE) ..................... 10 2004 020 184

(51) Int. Cl.
*F16K 31/122* (2006.01)
(52) U.S. Cl. ..................... 137/491; 137/493; 137/493.7
(58) Field of Classification Search ...... 137/485–493.9, 137/498.5
See application file for complete search history.

(56) References Cited

U.S. PATENT DOCUMENTS

| 2,249,206 A | * | 7/1941 | Hubbard | 137/491 |
|---|---|---|---|---|
| 2,460,774 A | * | 2/1949 | Trautman | 137/106 |
| 3,771,554 A | * | 11/1973 | Hassall | 137/491 |
| 4,402,336 A | | 9/1983 | Kalmanczhelyi | |
| 4,456,170 A | * | 6/1984 | Weigle et al. | 236/84 |
| 4,548,231 A | * | 10/1985 | Schwede | 137/491 |
| 4,564,039 A | | 1/1986 | Kalmanczhelyi | |
| 4,873,817 A | * | 10/1989 | Harms | 56/10.2 F |
| 5,097,746 A | * | 3/1992 | Asaoka et al. | 91/461 |
| 5,174,544 A | * | 12/1992 | Emanie | 251/30.01 |
| 5,421,545 A | * | 6/1995 | Schexnayder | 251/30.02 |
| 6,640,830 B2 | * | 11/2003 | Zahe | 137/491 |
| 7,204,266 B2 | * | 4/2007 | Krenzer et al. | 137/115.19 |
| 2003/0111114 A1 | * | 6/2003 | Koo | 137/491 |

FOREIGN PATENT DOCUMENTS

| DE | 31 17 815 A1 | 7/1983 |
|---|---|---|
| DE | 34 01 754 C2 | 11/1992 |
| DE | 31 17 815 C2 | 5/1993 |
| DE | 195 31 497 | 2/1997 |
| DE | 10 2004 010 374 A1 | 8/2005 |
| JP | A 2001-182707 | 6/2001 |
| WO | WO 95-32364 | 11/1995 |

* cited by examiner

*Primary Examiner*—Stephen Hepperle
*Assistant Examiner*—William McCalister
(74) *Attorney, Agent, or Firm*—Oliff & Berridge, PLC

(57) ABSTRACT

There is disclosed a variable metering orifice arrangement for a current divider and current adding device, the metering orifice arrangement including one or more working terminals by each of which a consumer can be supplied with pressure fluid. The metering orifice arrangement includes a metering orifice piston to which control pressure tapped off between two throttles of a pressure divider can be applied, wherein at least one of the throttles is variable.

15 Claims, 6 Drawing Sheets

METERING ORIFICE ARRANGEMENT FOR A HYDRAULIC CURRENT DIVIDER AND CURRENT ADDING DEVICE

The invention relates to a metering orifice arrangement as well as to a current divider and current adding device designed to include such metering orifice arrangement.

Hydraulic current dividers ensure that a given pressure fluid flow flows in desired partial quantities via plural hydraulic consumers or hydraulic loads arranged in parallel to each other independently of the load pressure. If the pressure fluid flow is directed such that the individual flow valves of the current divider are disposed upstream of the hydraulic consumers, this is referred to as the operating state of dividing. If, however, the individual flow valves are arranged downstream of the hydraulic consumers, this is referred to as the operating state of adding.

Each flow valve of a current divider comprises a metering orifice and a pressure regulator which upon dividing is disposed downstream of the metering orifice. During dividing the pressure regulators are loaded with the maximum load pressure in the closing direction and restrict the fluid flow between the respective metering orifice and the load so strongly that the pressure behind all metering orifices is equal to the maximum load pressure or is slightly above the latter. As regards this arrangement and the pressure application of the pressure regulators, a current divider is similar to a so-called LUDV (load-pressure independent flow distribution) control, as it is shown, for instance, in WO 95/32364 which is a special case of a load sensing control. In the case of such control the maximum load pressure is indicated to a variable-displacement pump and the latter is controlled such that a pump pressure lying above the load pressure by a predetermined pressure difference $\Delta p$ is prevailing in the pump conduit. In the event of a LUVD control the division of the individual partial flows is maintained even when the pump pressure drops. For in this case of a so-called undersupply nothing is changed about the pressure downstream of the metering orifices. Ahead of all metering orifices the dropped pump pressure is applied in the same way so that the pressure difference has varied in the same way at all metering orifices.

Current dividers can be used irrespective of whether a constant pump or a variable-displacement pump is used as pressure fluid source and of how the variable-displacement pump is adjusted. When used in a travel drive, the discharge rate is adjusted, for instance, in response to the deflection of a joystick or a pedal and is then apportioned to the hydraulic consumers in the desired volume ratios by the current divider.

An "adding" of partial quantities of pressure fluid cannot be performed by the control according to WO 95/32364. For, upon adding it has to be ensured that no longer the maximum pressure but the minimum pressure of the pressures prevailing between pressure regulators and consumers is applied to the pressure regulators in the closing direction.

A current divider for dividing and adding is known from DE 195 31 497 A1. In such a control arrangement the pressure regulators allocated to the consumers are biased via centering springs into an opening position, wherein in the operating state of "dividing" the maximum load pressure is applied to them and in the operating state of "adding" the respective minimum effective load pressure is applied to them via a pilot valve so that in both operating states the pressure loss above the metering orifices can be kept constant independently of the load pressure.

From DE 34 01 754 C2 a hydraulic flow dividing and adding device is known in which a pressure regulator via which during dividing the pressure downstream of the fixed metering orifice is restricted to the load pressure is allocated to each consumer, for instance hydraulic motors of a travel drive.

In DE 31 17 815 A1 a flow dividing and adding device comprising a metering orifice arrangement is disclosed including a common first working terminal at the pump side and plural second working terminals at the consumer side. A single metering orifice piston of this metering orifice arrangement is biased via a centering spring arrangement into a closing position and includes two control edges one of which is active during dividing and the other is active during adding. A rear end face of the metering orifice piston immerses into a control chamber to which a control pressure can be applied which is loaded with a control pressure via a control conduit extending between the first working terminal and the control chamber and including a fixed throttle and a check valve. This control conduit is connected to the second working terminals of the metering orifice arrangement via respective orifices.

In the afore-described solutions suited for an adding and dividing operation the pressure regulator pistons of the pressure regulators allocated to the consumers are provided in different control positions dependent on the individual load pressure. Usually the pressure regulator pistons are forced into their home position (for instance in the home position open) by a comparatively weak spring (pressure force equivalent within the range of from 1 to 3 bar). During operation (dividing) the pressure regulator of the consumer having the lowest load pressure is close to the control edge in a closing position so that, accordingly, the spring of this pressure regulator is biased more strongly than the springs of the other pressure regulators having a higher load pressure. So, for instance, the tension of the spring of the lowest load pressure consumer is 3 bars, whereas that of the highest load pressure consumer is 1.5 bars. These different spring tensions result in different pressures in the area between the respective metering orifices and the allocated pressure regulators so that also the pressure drop above the allocated metering orifices and thus the pressure fluid volume flow varies correspondingly. I.e. in the case of a difference in the spring bias of 1.5 bar the pressure differences at the individual metering orifices can also vary accordingly. These deviations resulting from the different pressure regulator spring tensions are negligible, if the pressure drop above the allocated metering orifice is relatively high. In the case of a low pressure drop above the metering orifice the afore-mentioned variations are great, however, considered in relation, and result in errors during dividing/adding the consumer quantities. This quantity error can result in an undesired slip in travel drives, for instance.

Compared to this, the object underlying the invention is to provide a metering orifice arrangement and a hydraulic current divider and current adding device including the former in which the quantity error is variable.

This object is achieved, as regards to the metering orifice arrangement, by embodiments of the hydraulic current divider and current adding device described herein.

In accordance with the invention, the metering orifice arrangement includes a metering orifice piston for controlling one or more variable metering orifices for each direction of flow. Each of the variable metering orifices is arranged between a common first terminal (pump terminal) and a working terminal at the consumer side. The metering orifice piston is loaded, on the one hand, with the pressure at the pump terminal and, on the other hand, with a control pressure which is tapped off by a pressure dividing circuit between the pump terminal and the working terminals. In the solution according to the invention, this pressure dividing circuit at least includes a variable throttle by which the pressure in the control chamber can be adjusted so that the cross-section of the metering orifice can be varied in response to the pressure prevailing at the pump terminal. For minimizing the quantity errors described in the beginning the variable throttle is varied such that the pressure is increased at the entry of the metering orifice (pump terminal) and the pressure drop above the metering orifices is appropriately increased and thus the error resulting from the different biases of the pressure regulator springs is relatively smaller. By this solution the slip of a travel drive, for instance, can be minimized in unfavorable operating conditions by minimum expenditure on apparatuses.

The comparatively great error may also be deliberately exploited, however, when controlling the connected consumers so as to admit, for instance, a slip during the normal traveling operation.

In accordance with the invention, it is especially preferred when the variable throttle is designed as a continuously variable pilot valve and a fixed throttle having a constant cross-section is disposed in the control oil flow path between the first terminal (pump terminal) and the pilot valve.

In a preferred embodiment of the invention a metering orifice piston is guided in a metering orifice sleeve in which windows allocated to respective working terminals, i.e. to respective consumers, are formed that are controlled to be opened via the metering orifice piston. The cross-section of these windows determines the partial volume flows to the individual consumers.

In a preferred embodiment the metering orifice piston includes two control edges one of which is active during dividing and the other is active during adding. The adding control edge preferably is an annular shoulder of the metering orifice piston.

In order to keep differences in pressure as small as possible during adding, at the front of the metering orifice piston plural axial bores are formed which open into an annular groove forming the afore-mentioned annular shoulder so that it is ensured that the pressure prevailing in the annular chamber corresponds to that prevailing at front-side input or pump terminal of the metering orifice.

The metering orifice piston confines at the rear a control chamber connected to the pump terminal of the metering orifice via a control passage. In this control passage the nozzle of the pressure dividing circuit is disposed.

The pilot valve can be stepwise variable so that the flow cross-sections of the metering orifice are varied in a correspondingly stepwise manner.

In an especially preferred embodiment the branch control conduit is branched downstream of the pilot valve, wherein an orifice is arranged in each branch conduit leading to a working terminal.

The metering orifice arrangement has an especially compact design when the centering spring arrangement biasing the metering orifice piston into its home position acts upon a cup-shaped spring plate, an end portion of a centering spring of the centering spring arrangement immersing into a receiving chamber confined by a shroud of the spring plate. In order to prevent inclusion of control oil in this receiving chamber a shroud bore is formed in the shroud.

In a variant of the invention the control arrangement is to include a free running in which all working conduits are interconnected. This free running can be easily realized in the metering orifice according to the invention by the fact that the metering orifice sleeve is slidably guided in a valve bore of a valve housing and can be shifted via a control pressure from a home position into a position in which the passages in the valve housing connected to the windows of the metering orifice sleeve are released by the metering orifice sleeve and are thus short-circuited.

The free running can be blocked by fixing the metering orifice sleeve by means of a screw plug.

The metering orifice arrangement has an especially compact design when the axis of the pilot valve extends at right angles with respect to the axis of the metering orifice.

Other advantageous further developments of the invention are the subject matter of further subclaims.

Hereinafter preferred embodiments of the invention are explained in detail by way of schematic drawings in which.

The concept according to the invention can be used especially in hydrostatically driven machines having a closed or open hydraulic circuit, with a focus of application being put on rotational drives, for instance travel drives, winch drives or belt drives.

Figure 1:
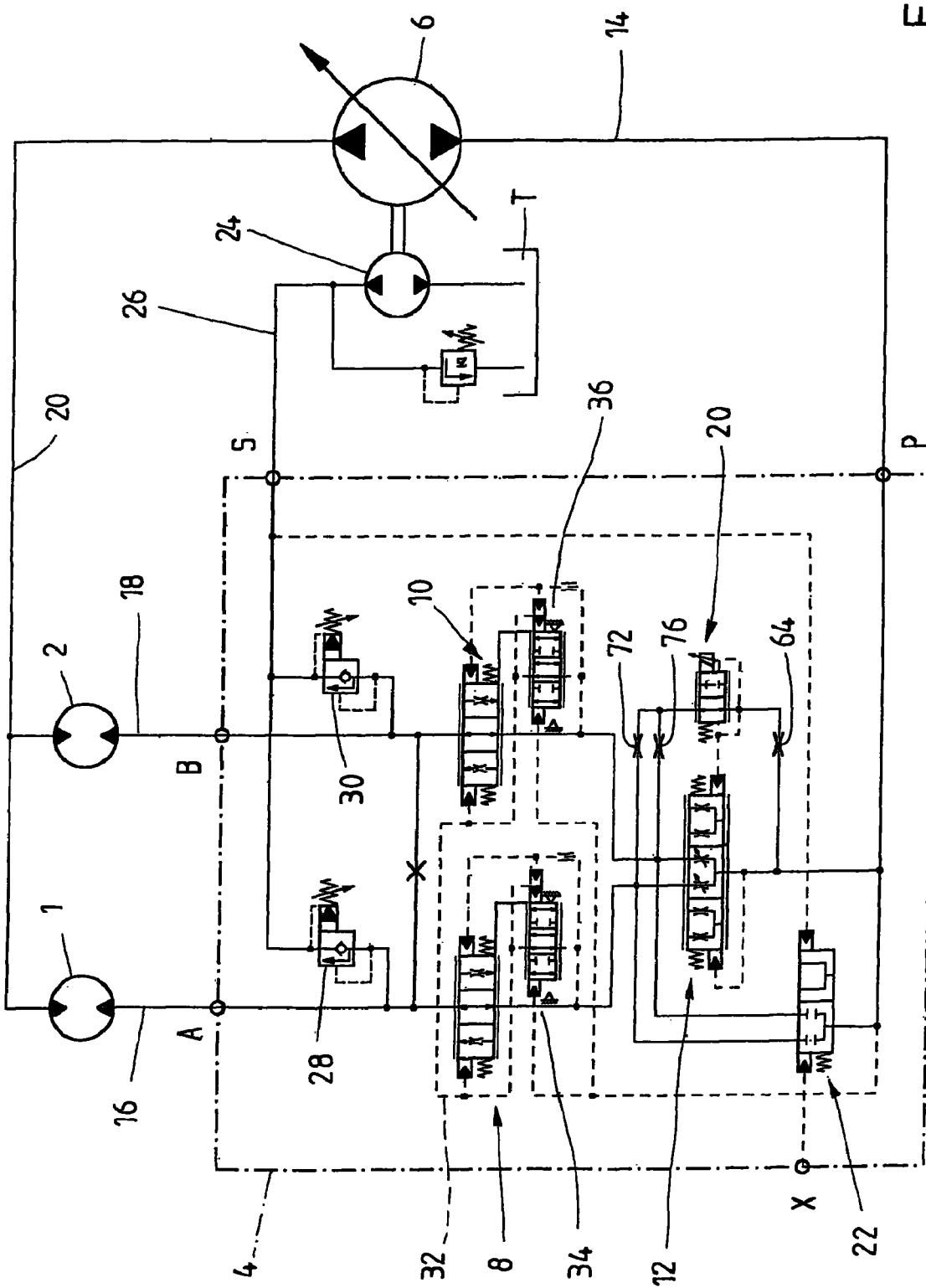
FIG. 1 shows a block diagram of a LUVD control arrangement for the supply of two consumers.

FIG. 1 illustrates, by way of example, a circuit diagram of a control arrangement for a travel drive of a mobile working implement. The control arrangement is a closed circuit, the travel drive including two hydraulic motors 1, 2 which are connected to a variable-displacement pump 6 via a mobile control block 4. The pressure fluid is distributed from the variable-displacement pump 6 to the hydraulic motors 1, 2 via the mobile control block 4, wherein an individual pressure regulator 8, 10 is allocated to each hydraulic motor 1, 2. Ahead of the two pressure regulators 8, 10 a variable metering orifice arrangement is arranged which will be abbreviated to metering orifice 12 hereinafter and by which a pressure fluid volume flow fed to a supply conduit 14 is divided into two partial flows guided to the hydraulic motors 1, 2 via two working or advance conduits 16, 18. From the hydraulic motors a discharge conduit 20 leads back to the variable-displacement pump 6.

In the shown embodiment the metering orifice 12 allocated to the two pressure regulators 8, 10 has a pilot design, wherein the control pressure is tapped off between a proportionally adjustable pilot valve 20 acting as adjustable throttle and a nozzle 64 which jointly act as pressure divider. Moreover a free-running device 22 is allocated to the metering orifice 12 through which the two advance conduits 16,18 can be connected to each other.

In the embodiment described in the following the free-running devices 22, the pilot valve 20 and the metering orifice 12 are integrated in a valve means.

An auxiliary pump 24 by which pressure fluid can be fed from a tank T into a feed conduit 26 connected via two pressure feed valves 28 and 30 to the two advance conduits 16, 18 is allocated to the variable-displacement pump 6. Via these pressure feed valves 28, 30 in the case of a pulling load (downhill drive), for instance, pressure fluid can be sucked from the tank T in order to avoid cavitations in the advance conduits 16, 18. Moreover, through the two pressure feed valves 28, 30 the pressure in the advance conduit 16 and 18, resp., is restricted to a maximum value so that the consumers are protected against overload.

The control arrangement according to FIG. 1 is to be operated in the operating state of "dividing" and in the operating state of "adding". In the operating state of dividing the pressure fluid volume flow in the supply conduit 14 is divided into partial volume flows via the metering orifice 12 and is guided via the pressure regulators 8, 10 to the allocated consumers 1 and 2, respectively. The pressure drop above the common metering orifice 12 is kept constant independently of the load pressure by the pressure regulators 8, 10 so that the pressure fluid volume flows through the metering orifice 12 are dependent only on the opening cross-sections thereof formed individually for each consumer.

The basic structure of the two pressure regulators 8, 10 open in the home position is disclosed in the earlier patent application DE 10 2004 001253 so that here only the features essential to the comprehension of the invention are explained and, for the rest, reference is made to the a.m. earlier patent application or the subsequent priority applications thereof. These pressure regulators 8, 10 have two control edges one of which is active during the operating state of "adding" and the other is active during the operating state of "dividing". The pressure regulators moreover have at least one LS control edge through which, when the pressure regulator 28, 30 is open, a LS cross-section can be controlled to be opened via which a pressure corresponding to the load pressure is indicated to a load indicating conduit 32. Each of said two control edges is formed by means of a directional control valve 34, 36 integrated in the pressure regulator 8 and 10, respectively.

This design of the pressure regulator 8, 10 ensures that in the operating state of "dividing" a pressure corresponding to the maximum load pressure and in the operating state of "adding" a pressure corresponding to the minimum load pressure is indicated to the load-indicating conduit 32.

Figure 2:
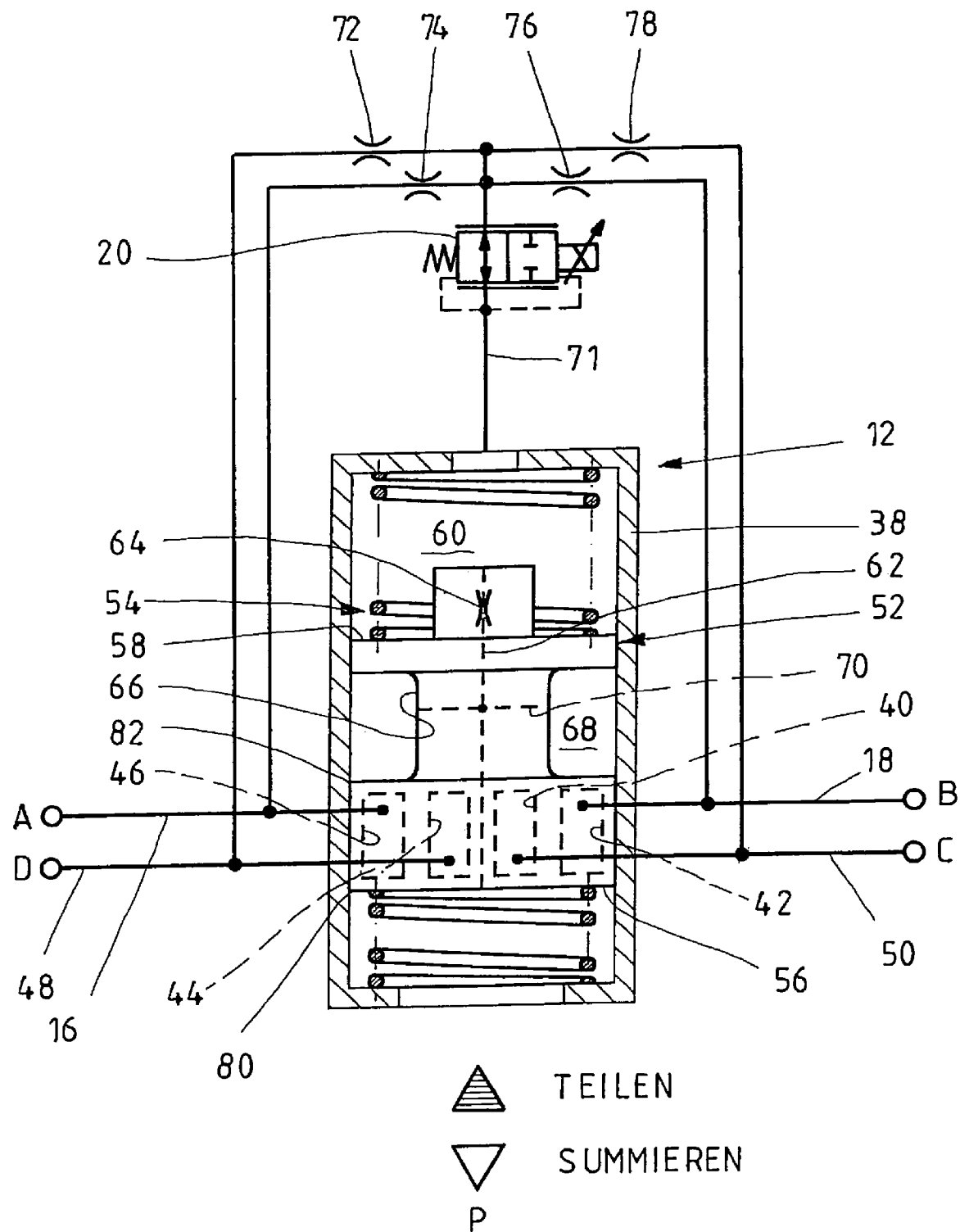
FIG. 2 is a schematic representation of a variable metering orifice allocated to plural consumers.

FIG. 2 shows a strongly schematized representation of a metering orifice 12 by which plural consumers (four consumers according to FIG. 2) can be supplied with pressure fluid and in which way it can be employed in principle in a circuit according to FIG. 1.

The metering orifice 12 has a metering orifice sleeve 38 inserted in a valve of the mobile control block 4. Four windows 40, 42, 44, 46 are formed at the metering orifice sleeve 38. The windows form a plurality of metering orifices. The windows are connected to working terminals A, B, C, D of the mobile control block 4 via advance conduits 16, 18, 48, 50 serving as discharge passages. Four consumers are connected to said working terminals A, B, C, D. In the embodiment shown in FIG. 1 the metering orifice 12 only includes two windows 46, 42 connected to the two working conduits 16, 18 so that two consumers can be supplied with pressure fluid.

In the metering orifice sleeve 38 a metering orifice piston 52 which is biased into a home position via a centering spring arrangement 54 is guided to be axially movable. In the embodiment shown in FIG. 2 the centering spring arrangement 54 is formed by two springs which act on the two end faces of the pistons and are supported on the face of the metering orifice sleeve 38.

In this home position the windows 40 to 46 are closed by the metering orifice piston 52 so that no connection exists between the front input terminal of the metering orifice 12 and the advance conduits 16, 18, 48, 50 forming discharge passages opening into a valve bore of block 4 (valve bore 88 in FIG. 3) via the windows 40 to 46. The front terminal P of the metering orifice is connected to the supply conduit 14. Thus the pressure prevailing in the supply conduit 14 is applied to the end face 58 of the metering orifice piston 52 located at the bottom in FIG. 2. The end face 58 of the metering orifice piston 52 located at the top in FIG. 2 confines a control chamber 60 connected to the front terminal P (at the bottom in FIG. 2) of the metering orifice sleeve 38 via a control passage 62 passing through the pressure regulator piston 52 and the nozzle 64.

According to FIG. 2, the metering orifice piston 52 moreover includes an annular groove 66 which jointly with the inner circumferential surface of the metering orifice sleeve 38 confines an annular chamber 68. In the area of the annular chamber 68 a transverse bore 70 permitting quick pressure compensation between individual portions of the annular chamber 68 is formed in the metering orifice piston 52.

The control chamber 60 is connected to the aforementioned advance conduits 16, 18, 48, 50 by a branching control conduit 71. Ahead of the branching, the proportionally adjustable pilot valve 20 constituting a pressure dividing circuit with the nozzle 64 is formed in the control conduit 71. The pressure prevailing in the control chamber 60 corresponds to the pressure between the pilot valve 20 and the nozzle 64. As an alternative to the proportional adjustment also a stepwise adjustment of the opening of the pilot valve can be provided.

Said pilot valve 20 is biased into an opening position by means of a spring and can be closed continuously or step-by-step by supplying current to a proportional magnet so that the control oil flow from the terminal P toward the advance conduits 16, 18, 48, 50 can be varied by adjusting the pilot valve 20 and, accordingly, the pressure effective in the control chamber 60 can be varied. In order to prevent unobstructed flowing of the control oil off the control chamber 60 via the pilot valve 20, an additional orifice 72, 74, 76, 78 is arranged in each branch conduit. In the case of such circuit no losses occur due to control oil flowing off, because the latter is returned into the pressure fluid flow again each time.

A dividing control edge 80 through which the windows 40, 42, 44, 46 can be controlled to be opened when the pressure increases at the terminal P is formed by the end face 56. In the operating state of "adding" the opening cross-section of the windows 40, 42, 44, 46 is defined by a control edge 82 formed by an annular end face of the annular groove 66.

In the operating state of "dividing" the pressure at the pressure terminal P acts on the lower end face 56 in the opening direction, while the force of the upper spring of the centering spring 54 (corresponds approximately 2 to 3 bar) and the pressure in the control chamber 60 act in the closing direction. The latter is variable by adjusting the pilot valve 20. If the pressure at the pressure terminal P exceeds the pressure in the control chamber plus the pressure force equivalent of the centering spring arrangement 54 active in the closing direction, the metering orifice piston 52 is moved out of its home position and is shifted into a control position in which the windows 40, 42, 44, 46 are controlled to be opened at least in portions. The opening cross-section of the windows is determined by the pilot valve 20 by which the pressure active in the closing direction is adjustable in the control chamber 60. I.e. by adjusting this pilot valve 20 the opening cross-section of the windows 40, 42, 44, 46 can be varied and, accordingly, the pressure at the pressure terminal P can be varied.

The pressure fluid volume flow flowing via the pressure terminal P to the metering orifice 12 is then divided into partial flows via the windows 40, 42, 44, 46 which are then guided through the advance conduits 16, 18, 48, 50 to the connected terminals. In the embodiment shown in FIG. 1 the pressure fluid volume flow is divided merely into two partial flows toward the hydraulic motors 1, 2 via the metering orifice 12 including merely two windows 42, 46.

The free-running device 22 is not taken into account in the schematic representation according to FIG. 2. Further details of the metering orifice will be explained hereinafter by way of the FIGS. 3 and 4 illustrating a concrete configuration of the metering orifice 12 for a circuit according to FIG. 1.

Figure 3:
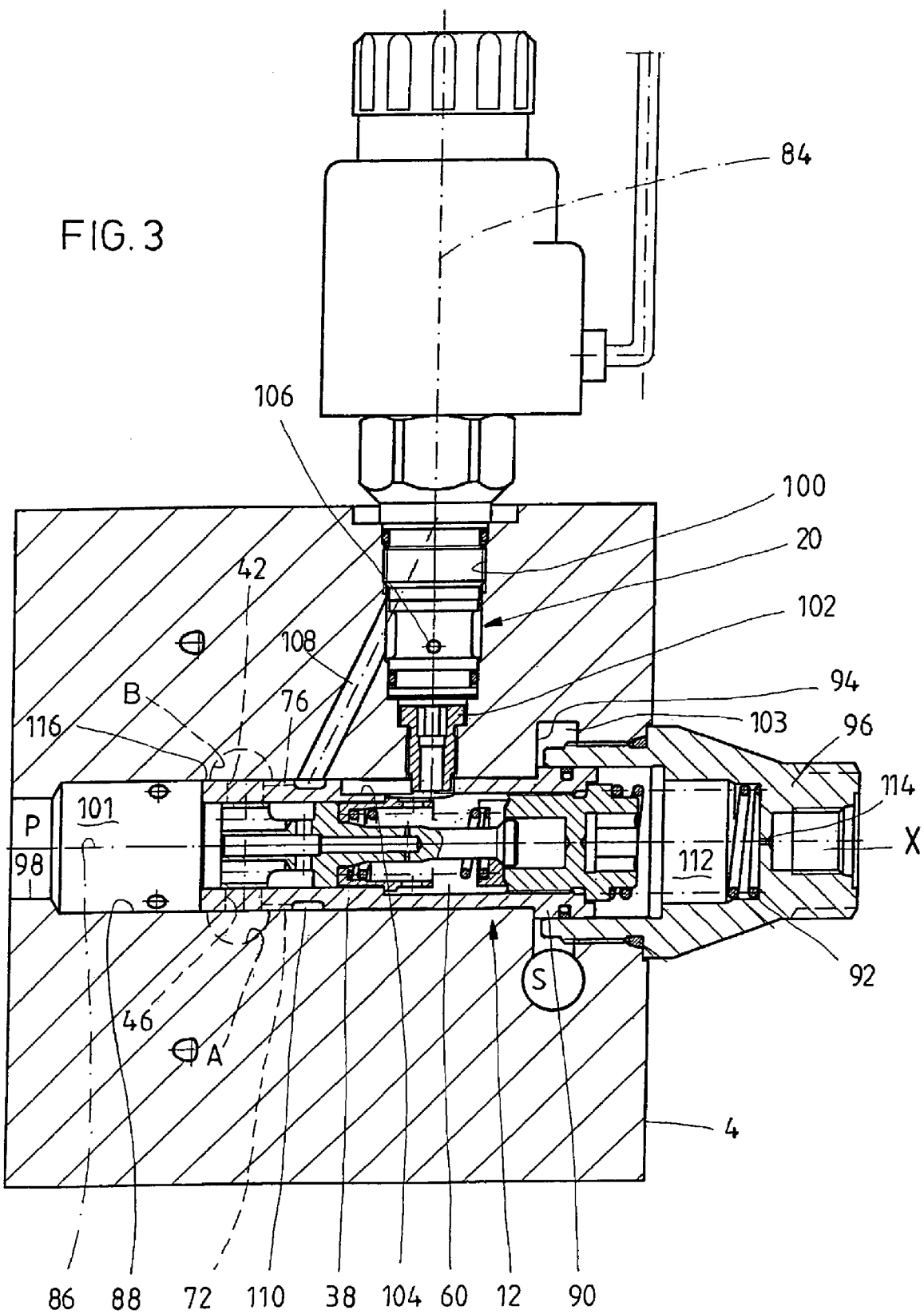
FIG. 3 is a sectional view of a concrete embodiment of a metering orifice according to FIG. 1.
Figure 4:
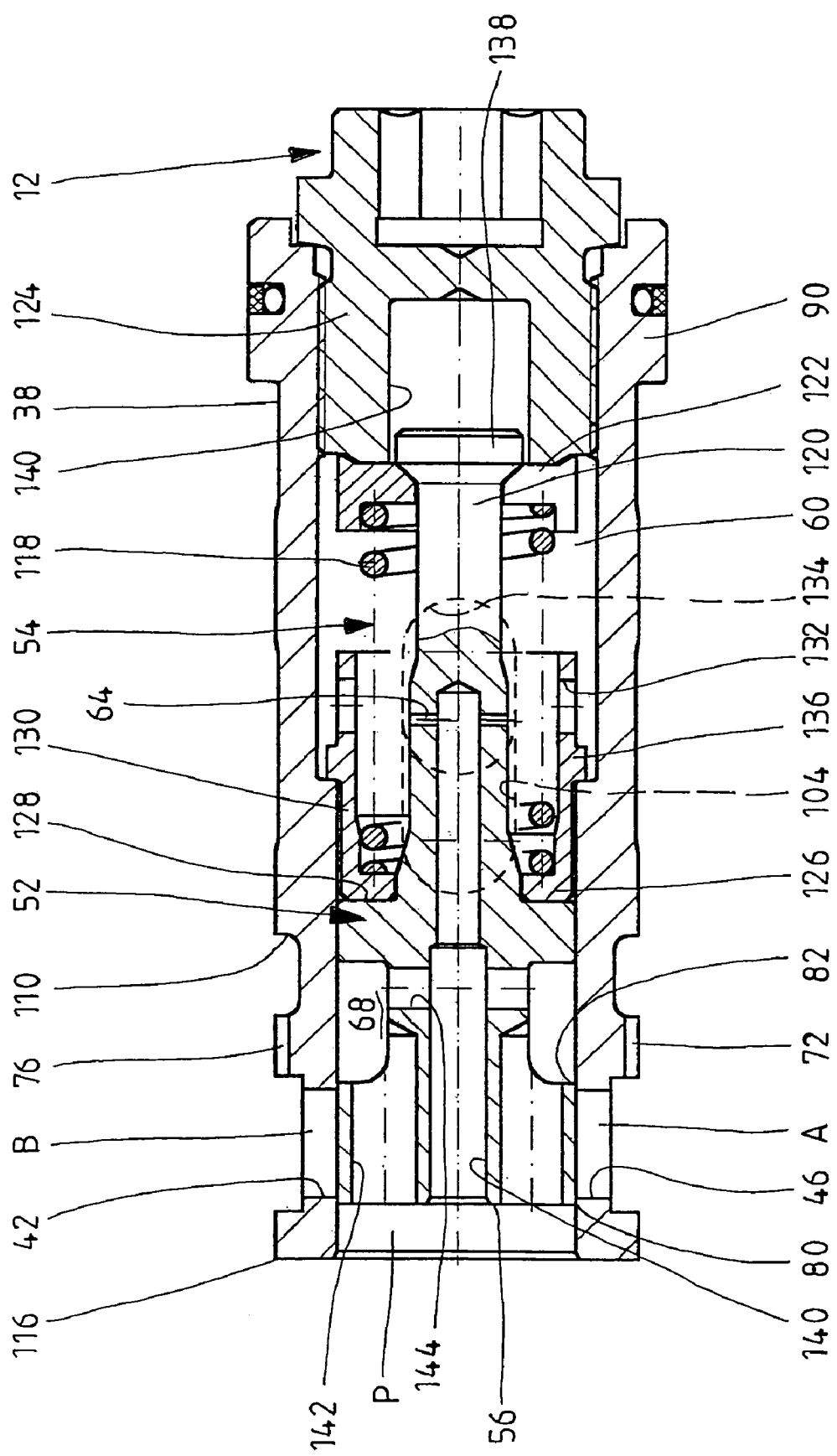
FIG. 4 is a detailed representation of the variable metering orifice of FIG. 3.

FIG. 3 shows a sectional view of the mobile control block 4 in which the metering orifice 12 and the pilot valve 20 are inserted. In accordance with FIG. 3, the two axes 84, 86 of the pilot valve 20 and the metering orifice 12 are arranged in a plane normal to each other. The metering orifice sleeve 38 is inserted to be axially movable in a valve bore 88 of the mobile control block 4 and includes a radial projection 90 which is biased with its annular end face on the left in FIG. 3 via a spring 92 against a shoulder 94 of the valve bore 88. The spring 92 in turn is supported at a screw plug 96 closing the right end portion of the valve bore 88. A spring chamber 112 receiving the spring 92 is connected to a passage leading to a control terminal X of the mobile control block 4 (see FIG. 1). As long as this control pressure (pump pressure) is applied to the control terminal X, the metering orifice sleeve 38 remains in its position shown in FIG. 3. By appropriately lowering or switching off the pump pressure at the control terminal X the metering orifice sleeve 38 can be shifted to the right by the feed pressure applied to the pressure chamber 103 against the force of the spring 92 so that a free-running control edge 116 formed by the neighboring annular end face of the metering orifice sleeve 38 short-circuits the two passages connected to the terminals A and B in the mobile control block 4 so as to adjust a free-running in which the advance conduits 16, 18 are hydraulically interconnected. The flow resistance occurring in the free-running circuit is below the pressure regulator control forces so that the pressure regulators 8, 10 cannot move into the control position. An uncontrolled quantity distribution takes place.

According to FIG. 3, the valve bore 88 passes through the mobile control block 4 in the horizontal direction (view according to FIG. 3), wherein the metering orifice sleeve 38 does not extend over the entire axial length of the valve bore 88 so that on the left side from an annular end face 98 of the metering orifice sleeve there is provided a pressure chamber 101 into which the supply conduit 14 opens through a supply passage 98 formed in the mobile control block 4.

The pilot valve 20 is inserted in a pilot valve bore 100 and is adjacent at the front to a torsion protection 102 screwed into the pilot valve bore 100 which extends with its lower end portion into the valve bore 88 and in so doing immerses in an oblong hole 104 of the metering orifice sleeve 38. The torsion protection 102 is a hollow sleeve so that the control chamber 60 of the metering orifice 12 is connected to the input terminal of the pilot valve 20. I.e. the internal bore of the torsion protection 102 forms a part of the control conduit 71.

An output terminal 106 of the pilot valve 20 is connected to the valve bore 88 via an oblique discharge passage 108. In the opening area of this oblique discharge passage 108 a circumferential groove 110 connected view two longitudinal slits indicated in broken lines to the windows 42, 46 likewise indicated in broken lines. These longitudinal slits practically form the two nozzles 72, 76 by which the oblique discharge passage 108 forming part of the branch control conduit 71 is separated from the passages connected to the working terminals A,B.

FIG. 4 shows an enlarged representation of the metering orifice 12 according to FIG. 3. In the metering orifice sleeve 38 the metering orifice piston 52 is guided to be axially movable and is biased via the centering spring arrangement 54 into its shown home position in which the two windows 46, 42 are closed by the control edges 80, 82. The recesses adjacent to the windows 46, 42 are not formed by annular grooves but by flattened portions at the outer circumference of the metering orifice sleeve 38. The surface of the flattened portions is selected such that the corner areas of the rectangular windows 42, 44 are not covered.

In the embodiment shown in FIG. 4 the centering spring arrangement 54 is constituted by one single centering spring 118 which, on the one hand, is biased via a spring plate 122 acting upon an axial projection 120 against a screw plug 124 closing the right end portion (FIG. 4) of the valve bore 88. Via a cup-shaped spring plate 126 the other end portion of the centering spring 118 acts upon a radial shoulder 128 by which the outer circumference of the metering orifice piston 52 is stepped back to the axial projection 120. A radially extended end portion 138 of the axial projection 120 immerses in a recess 140 of the plug 124 so that the axial overall length of the metering orifice 12 is kept very compact.

In a shroud 130 of the spring plate 126 shroud bores 132 are formed so that the chamber enclosed by the cup-shaped spring plate 126 is connected to the control chamber 60 forming the spring chamber so that no pressure fluid can be added in this chamber enclosed by the spring plate 126.

In accordance with FIG. 4, the oblong hole 104 opens into the control chamber 60 via a breakthrough 134 so that a connection to the input terminal of the pilot valve 20 is brought about via said breakthrough 134 and the bore of the torsion protection 102.

According to FIG. 4, the spring plate includes at its outer circumference an annular shoulder 136 by which it is adjacent to a corresponding radial shoulder of the metering orifice bore so that the metering orifice piston 52 is resiliently biased into its shown home position by the two spring plates 122 and 126.

The metering orifice piston 52 centrally includes a piston bore 140 which opens in the area of the axial projection 120 into the chamber enclosed by the spring plate 126 via at least one nozzle bore. Said nozzle bore forms the nozzle 64 according to FIG. 2.

At an axial distance from the piston bore 140 plural axial bores 142 located on a reference circle are formed in the end face 56 of the metering orifice piston 52, each axial bore opening into the annular chamber 68 so that the pressure prevailing at the front-side terminal P is also applied to the annular chamber 68. Moreover, the axial bore 140 is also connected to the annular chamber 68 via a transverse bore 144 so that a quick pressure compensation is ensured so that the pressure prevailing in the annular chamber 68 is also applied to the input of the nozzle 64.

In the embodiment shown in FIG. 4, the cross-sections of the two windows 46, 42 are identical so that the pressure fluid volume flow is divided 50:50. Basically also other division ratios can be adjusted by varying the window cross-sections.

In the case of dividing, at the front-side pump terminal P of the metering orifice 12 a comparatively high pressure (pump pressure) is applied so that the metering orifice piston 52 is shifted into an opening position in response to the force of the spring 118 and to the control pressure adjusted in the control chamber 60 via the pilot valve 20, wherein the control edge 80 controls the two windows 46, 42 to be opened.

In most cases the current divider and current adding device including a common metering orifice and the individual pressure regulators is adjusted such that a comparatively great error is admitted and thus—in the case of a travel drive—a slip is deliberately admitted. In case that the slip is to be reduced to a minimum, i.e. the pressure fluid volume flows are to be divided evenly to the consumers, the pilot valve 20 is adjusted in the closing direction. As mentioned in the beginning, this pilot valve 20 together with the nozzle 64 acts as pressure divider in the metering orifice piston 52 so that control oil flow is added in the control conduit 71 by controlling the pilot valve 20 to be closed and, accordingly, the pressure is increased downstream of the nozzle 64.

The metering orifice piston 52 is in equilibrium of forces, if the force generated by the first working terminal P is equal to the sum of the force of the spring 118 and the force generated by the pressure prevailing in the control chamber 60. The difference between the pressure prevailing in the first working terminal P and the pressure prevailing in the control chamber 60 therefore is equal to the pressure equivalent of the spring 118. If the spring force were independent of the position of the metering orifice piston 52, the pressure difference, thus the pressure drop through the nozzle and thus the amount of control oil flowing through the nozzle 64 would always be equal. In the case of an equal amount of control oil the pressure prevailing in the control chamber 60 can be varied by the fact that the flow cross-section of the pilot valve 20 and thus the pressure drop are varied by the pilot valve 20. If the flow cross-section is reduced, the pressure drop must be increased, because the pressure downstream of the pilot valve 20 is fixed by the pressure regulators 8, 10, the pressure must be increased upstream of the pilot valve 20. The equilibrium of forces at the metering orifice piston 52 is disturbed, the latter moves in the closing direction and adds the pressure fluid at the first working terminal P until the pressure again is higher than the pressure prevailing in the control chamber 60 by the pressure equivalent of the spring 118.

However, the spring force is not constant along the path of the metering orifice piston 52. If the latter moves in the closing direction due to a reduction of the flow cross-section of the pilot valve 20, the spring 118 is somewhat released and thus the spring force is reduced. For the equilibrium of forces at the metering orifice piston 52 no such great difference between the pressure prevailing at the first working terminal P and the control chamber 60 is necessary any more. The pressure drop through the nozzle 64 and thus also the control oil flow is reduced. This reduction of the control oil flow partly counteracts the reduction of the flow cross-section of the pilot valve 20, because a smaller control oil flow also produces a lower pressure drop above the pilot valve 20. In order to accumulate pressure in the control chamber 60 which is above the pressure downstream of the pilot valve 20 by a desired difference, this must be closed somewhat more than in the case of a constant control oil flow.

The increased pressure downstream of the nozzle 64 is applied to the control chamber 60 and acts in the closing direction of the metering orifice piston so that the metering orifice cross-section is appropriately controlled to be closed. As explained in the beginning, this closing of the metering orifice cross-section results in an accumulation of the pressure fluid volume flow so that the pressure prevailing at the metering orifice input (pump terminal P) increases and, accordingly, the pressure loss above the metering orifice is increased so that the relative error caused by the different bias of the pressure regulator springs is smaller in relation to the pressure difference above the metering orifice and thus a uniform pressure fluid division is ensured.

Accordingly, the active pressure in the control chamber 60 can be varied by adjusting the pilot valve 20 so that the opened cross-section can be appropriately influenced. In the embodiment shown in FIG. 1 the pilot valve 20 is adjusted dependent on the flow.

When adjusting a comparatively large flow cross-section of the windows 46, 42 (low pressure in the control chamber 60) the deviation of the actual partial flow from the desired partial flow is greater than when adjusting a small flow cross-section. This quantity deviation from the desired value can be deliberately used to adjust a slip, for instance in a travel drive. When reducing the orifice cross-section, practically a hydraulic locking takes place, because both hydraulic motors 1, 2 are supplied substantially with the predetermined desired pressure fluid quantity. In other words, when adjusting a comparatively large orifice cross-section, the pressure fluid volume flow is not divided in a 50:50 ratio (locking effect) but for instance in a 45:55 ratio so that a slip is deliberately admitted.

As is evident from FIG. 1, the pressure fluid volume flows adjusted via the total metering orifice 12 flow via the supply conduits 16,18 to the allocated pressure regulators 8, 10. These are opened in their shown home position and in the closing direction the pressure tapped off downstream of the metering orifice 12 is applied to them and in the opening direction the highest load pressure in the load indicating conduit 32 is applied to them. The directional control valve 34, 36 shown in FIG. 1 is integrated in a pressure regulator piston of the two pressure regulators 8, 10 as internal piston. As indicated, said internal piston is mechanically connected to the pressure regulator. The pump pressure acts on the end face of the internal piston on the left in FIG. 1, while the pressure prevailing in the pressure fluid flow path between the metering orifice 12 and the respective pressure regulators 8 and 10, resp., acts upon the right end face of the internal piston. During "dividing" the internal piston (directional valve 34, 36) is moved against a stop fixed to the housing (on the right in FIG. 1), during "adding" the internal piston is adjacent to the stop shown on the left in FIG. 1.

In the open home position of the pressure regulator 8, 10 the pressure between the metering orifice 12 and the pressure regulator 8 or 10 of maximum load pressure is indicated into the LS conduit 32 and thus is applied to all pressure regulators 8, 10. When shifting the pressure regulator from the opening position into a control position the internal piston of the directional control valves 34, 36 is moved by the mechanical coupling into one of the shown locking positions so that the pressure prevailing in the pressure fluid flow path from the metering orifice 12 to the respective pressure regulator 8, 10 cannot be tapped off any more. The pressure prevailing in the load indicating conduit 32 is also applied to the end face of the internal piston of the directional control valve 34, 36 on the right in FIG. 1.

The pressure regulator piston of the pressure regulators 8, 10 is pressurized, on the one hand, by the pressure prevailing in the load indicating conduit 32 and, on the other hand, by the pressure tapped off between the metering orifice 12 and the respective pressure regulator 8, 10, wherein the pressure fluid volume flow is restricted in the case of equilibrium of forces by the pressure regulators 8, 10 such that the pressure drop above the metering orifice 12 is constant independently of the load.

In the operating state of "adding" the pressure prevailing at the terminals A, B of the metering orifice 12 is higher than the pressure prevailing at the front-side terminal P. By the correspondingly higher pressure prevailing in the control chamber 60 the metering orifice piston 52 is shifted to the left in the representation according to FIG. 4 so that by the control edge 82 the windows 46, 42 are controlled to be opened against the force of the centering spring arrangement 54 and the partial volume flows are added at the terminal P.

During "adding" the control oil flow flows from the working terminals A,B via the respective orifices 72, 74, 76, 78, the pilot valve 20, the branch control conduit 71, the control chamber 60, the nozzle 64 and the control passage 62 as by-flow to the pump terminal P. Similar to the operating state of "dividing", the pilot valve 20 can be adjusted in the closing direction to even the pressure fluid volume flow distribution so that the by-flow is added ahead of the pilot valve 20 and the by-flow is appropriately reduced via the pilot valve and the nozzle 64. Thus also the pressure drop is reduced so that the pressure in the control chamber 60 falls and correspondingly the metering orifice piston 52 closes more than this would be the case with an opened pilot valve 20 - i.e. the metering orifice piston 52 is moved to the right in the closing direction in the representation according to FIG. 4 and is moved upwards in the closing direction in the representation according to FIG. 2 so that the pressure fluid volume flow is added in the direction of the pump and thus is distributed more evenly.

During adding the internal pistons of the two directional control valves 34, 36 are shifted against the left stop (FIG. 1) and, correspondingly, the pressure of the lowest load is indicated to the load indicating conduit 32. As regards further details of the structure and the function of the two pressure regulators 8, 10 and the directional control valves 34, 36, reference is made to the earlier patent application of the applicant mentioned in the beginning.

In the embodiment according to FIG. 1 the metering orifice 12 is designed to include two windows for supplying two consumers 1, 2, in the embodiment according to FIG. 2 four consumers can be supplied via four windows; of course, even more consumers can be supplied by varying the number of windows so that the system can practically be extended to any number of pressure regulator axes. The metering orifice 12 can also be designed without the free-running circuit.

In the afore-described embodiments current dividers/current adding devices have been explained in which a pressure regulator 8, 10 is allocated to each consumer and a common adding orifice is allocated to plural consumers. In the case of such an adding orifice plural metering orifices are provided at one metering orifice piston.

Hereinafter an embodiment will be described in which a so-called current divider is designed to have individual orifices, wherein only one metering orifice is allocated to each metering orifice piston. That is to say, the piston controls only one metering orifice cross-section to be opened so that an individual metering orifice is allocated to each consumer. Such circuit can be used, for instance, in a travel drive so that each individual wheel can be separately controlled.

Figure 5:
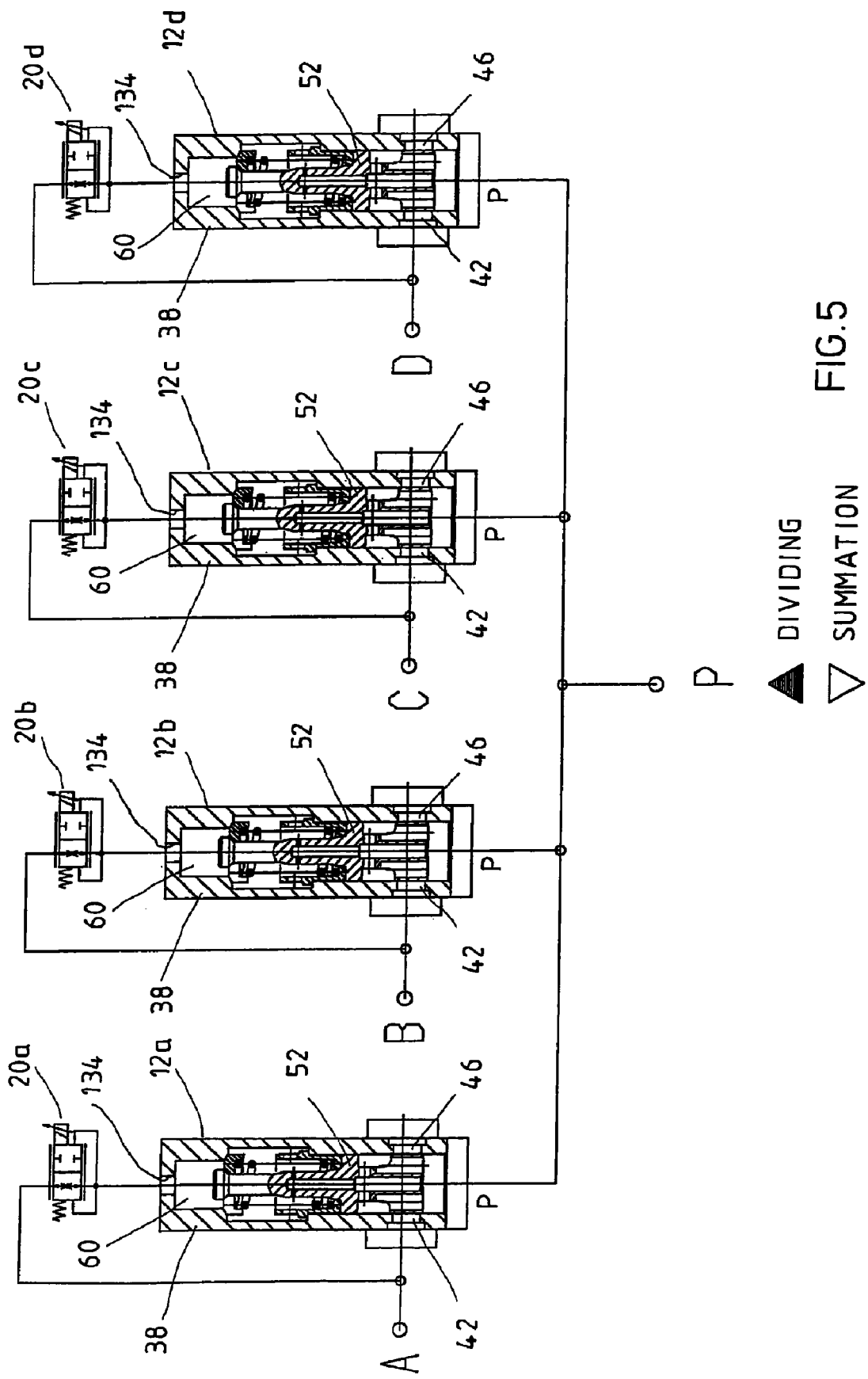
FIG. 5 is a block diagram of a control arrangement in which a variable metering orifice is allocated to each consumer.

FIG. 5 shows a basic circuit diagram of such a control arrangement including an adding orifice. The control arrangement has four second working terminals A, B, C, D to each of which a metering orifice arrangement 12a, 12b, 12c, 12d and a pilot valve 20a, 20b, 20c, 20d is allocated. In the pressure fluid flow path between the output terminal of the metering orifice arrangements 12a, 12b, 12c, 12d and the respective working terminal A, B, C, D an individual pressure regulator and a pressure suction valve not represented in the picture according to FIG. 5 are provided exactly as in the afore-described embodiment. The structure of the metering orifice arrangement 12a, 12b, 12c, 12d substantially corresponds to that described in FIGS. 4 and 5 with the exception that not plural windows constituting a metering orifice are formed at the metering orifice piston 52 but that these windows 42, 46 are all hydraulically connected to the allocated terminal A, B, C or D. This can be brought about, for instance, by the fact that an annular groove into which the windows open is formed in the block accommodating the metering orifice arrangement 12. As an alternative, instead of the flattened portions 42, 46 in the embodiment according to FIG. 4 a circumferential annular groove can be used. As in the afore-described embodiment, the pressure fluid flows during dividing from the variable-displacement pump 6 (see FIG. 1) to the respective first terminal P at the pump side and via the windows 42, 46 and the respective allocated individual pressure regulator to the respective working terminal A, B, C, D, and from there to the allocated consumer.

Moreover, in the representation according to FIG. 5 the metering orifice arrangement 12a, 12b, 12c, 12d is designed, in contrast to the afore-described embodiments, without screw plug 124 and, for the sake of simplicity, is shown having a metering orifice sleeve 38 closed at the front, wherein the breakthrough 134 through which the control chamber 60 is connected to the allocated pilot valve 20a, 20b, 20c, 20d corresponds to the shroud breakthrough 134 in FIG. 4.

Another difference of the metering orifice arrangement according to FIG. 5 from the above-described embodiments is perceived in the fact that a torsion protection of the metering orifice piston 52 is not required, because all windows 42, 46 are hydraulically connected to each other anyway and thus no predetermined rotational angle position of the metering orifice piston 52 must be observed.

Figure 6:
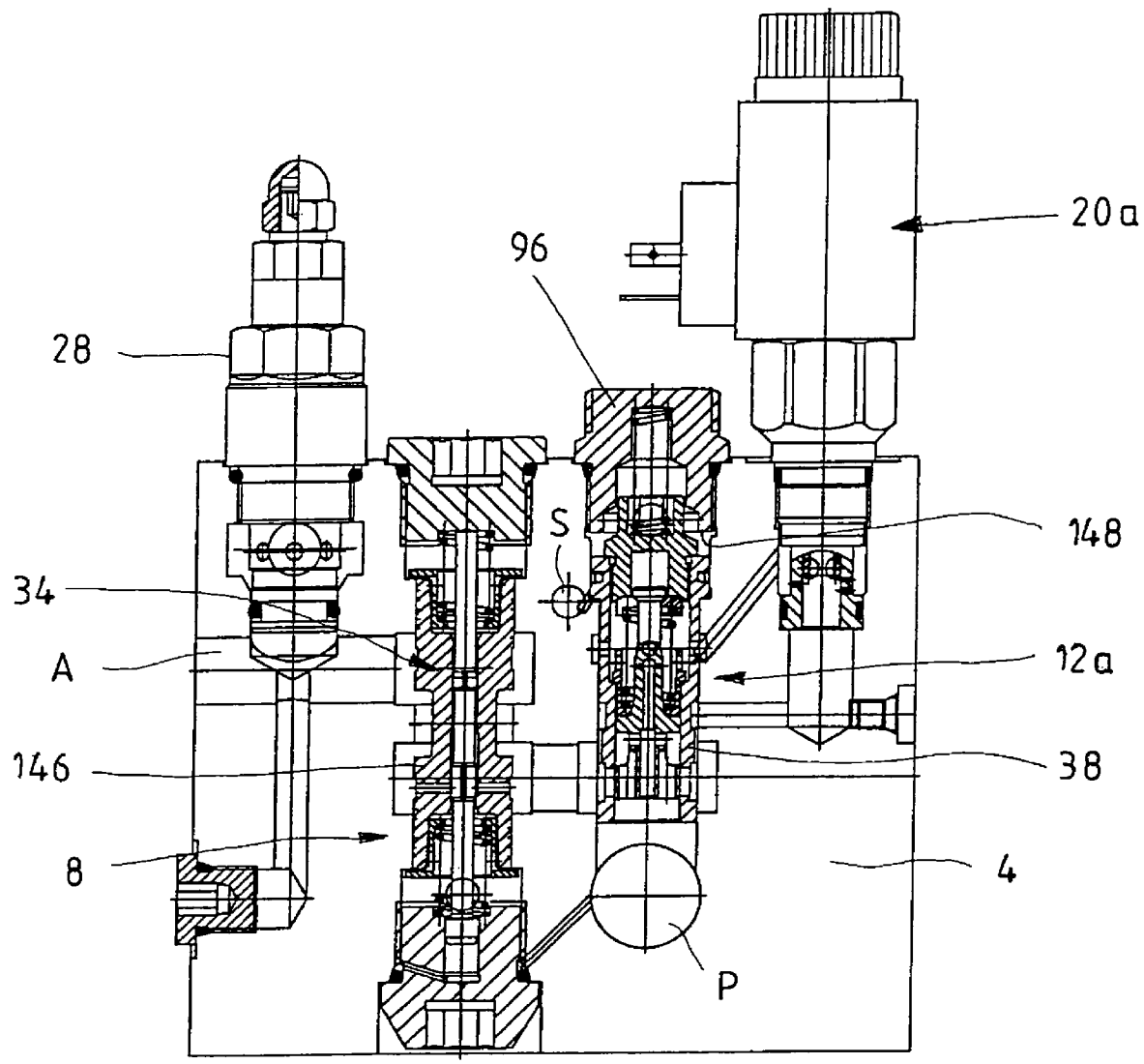
FIG. 6 shows a valve block for a circuit according to FIG. 5.

FIG. 6 shows a partial section across a mobile control block 4 in which the hydraulic components allocated to each consumer are accommodated. The mobile control block 4 has a pump-side pressure terminal P and a working terminal A connected to the consumer by a connecting plate.

The tank terminal T is not visible in the representation according to FIG. 6. Moreover control terminals S and X are formed at the mobile control block 4. The metering orifice arrangement 12a, the allocated pilot valve 20a, the individual pressure regulator 8 and the pressure feed valve 28 are inserted in the mobile control block 4. The structure of the metering orifice arrangement 12a substantially corresponds to that to be taken from FIGS. 3 and 4. The metering orifice arrangement 12a shown in FIG. 6 is axially fixed in a valve bore of the mobile control block 4 via a screw plug 96. The metering orifice sleeve 38 is arranged to be axially movable in the valve bore and is spring-biased into its shown home position and the control pressure prevailing at the working terminal S is applied in the opening direction and the pressure prevailing at the control terminal X is applied in the closing direction. As in the case of the afore-described embodiment, by lowering the control pressure at the control terminal X of the mobile control blocks 38 all metering orifice arrangements 12a, 12b, 12c, 12d can be shifted to interconnect the working terminals A, B, C, D and to adjust the free running.

The individual pressure regulator 8 is opened in its home position and, regarding the structure, corresponds to that disclosed in the patent application DE 10 2004 001253. As mentioned in the beginning, this pressure regulator includes two control edges one of which is active during adding and the other is active during dividing. In a pressure regulator piston 146 of the individual pressure regulator 8 the shift valve 34 shown in FIG. 1 is integrated including an internal piston which is slidably guided in the pressure regulator piston 146. The pressure prevailing at the working terminal P is applied upwards to the pressure regulator piston 146. The pressure acting in the opposite direction on the pressure regulator piston 146 is applied via the directional control valve 34. As regards further details, the applicant's foregoing earlier patent application is referred to.

The pressure feed valve 28 has a conventional structure so that any further explanations are dispensable.

In the above-described metering orifice arrangements 12 the free running can be blocked in a very simple manner by designing the screw plug 96 such that it prevents an axial movement of the metering orifice sleeve 38 for adjusting the free running. To this effect, in the embodiment according to FIG. 6 the screwed annular end face 148 of the screw plug 96 would have to be extended until it rests on the neighboring annular end face of the metering sleeve 38. In the embodiment shown in FIG. 3 an internal shoulder 150 should be appropriately extended in axial direction.

In the embodiment described in the beginning the metering orifice piston is protected against torsion by the torsion protection inserted in radial direction and arranged coaxially with respect to the pilot valve 20. Since in the embodiment according to FIGS. 5 and 6 no such torsion protection is required, is it not necessary to insert the pilot valve 20 staggered by 90° with respect to the metering orifice arrangement 12 in the pressure feed valve 28 and the pilot valve 20—accordingly the pilot valve 20a can be inserted in the mobile control block axially parallel to the metering orifice arrangement 12.

Since in the afore-described embodiment a separate metering orifice arrangement is allocated to each consumer, the orifices (nozzles) 72, 74, 76, 78 can be dispensed with.

In case that ever different amounts of pressure fluid are to be supplied to the consumers, the inside width of the windows of the metering orifice sleeve 38 of the metering orifice arrangement 12a, 12b, 12c, 12d can be differently selected in response to this pressure fluid volume flow. Basically it is also possible, of course, to design the individual windows 40, 42, 44, 46 to have different cross-sections in the adding orifice described in the beginning.

There is disclosed a variable metering orifice arrangement for a current divider and current adding device, the metering orifice arrangement including one or more working terminals by each of which a consumer can be supplied with pressure fluid. The metering orifice arrangement includes a metering orifice piston to which a control pressure can be applied which is tapped off between two throttles of a pressure divider, wherein at least one of the throttles is variable.

LIST OF REFERENCE NUMERALS

1 Hydraulic motor
2 hydraulic motor
4 mobile control block
6 variable-displacement pump
8 pressure regulator
10 pressure regulator
12 metering orifice
14 supply conduit
16 advance conduit
18 advance conduit
20 pilot valve
22 free-running device
24 auxiliary pump
26 feed conduit
28 pressure feed valve
30 pressure feed valve
32 load indicating conduit
34 directional control valve
36 directional control valve
38 metering orifice sleeve
40 window
42 window
44 window
46 window
48 advance conduit
50 advance conduit
52 metering orifice piston
54 centering spring arrangement
56 lower end face
58 upper end face
60 control chamber
62 control passage
64 nozzle
66 annular groove
68 annular chamber
70 transverse bore
71 control conduit
72 orifice
74 orifice
76 orifice
78 orifice
80 control edge
82 control edge
84 axis of pilot valve
86 axis of metering orifice
88 valve bore
90 radial projection
92 spring
94 shoulder
96 screw plug
98 supply passage
100 pilot valve bore
101 pressure chamber
102 torsion protection
103 pressure chamber
104 oblong hole
106 output terminal
108 oblique passage
110 circumferential groove
112 spring chamber
114 control bore
116 free-running control edge
118 centering spring
120 axial projection
122 spring plate
124 screw plug
126 cup-shaped spring plate
128 radial shoulder
130 shroud
132 shroud bore
134 breakthrough
136 annular shoulder
138 end portion
140 piston bore
142 axial bore
144 transverse bore
146 pressure regulator piston
148 annular end face
150 inner shoulder

The invention claimed is:

1. A metering orifice arrangement for a hydraulic current divider and current adding device comprising:
at least one metering orifice piston, each piston controlling one or more of a plurality of variable metering orifices, the variable metering orifices being located in parallel to each other for each flow direction, each of the metering orifices being arranged between a common first terminal and second working terminals, including separated interfaces, at a consumer side for a plurality of consumers, wherein a pressure prevailing in the first terminal is applied to the at least one metering orifice piston in a first direction,
an adjustable pressure dividing circuit between the first terminal and the second working terminals, the adjustable pressure dividing circuit including at least two throttles for generating a control pressure lying between the pressure prevailing in the first terminal and a pressure prevailing in the second working terminals, the control pressure being applied to the at least one metering orifice piston through a control chamber in a second direction that is opposed to the first direction, and a centering spring arrangement by which the at least one metering orifice piston is centered in a central position such that the metering orifices are closed, whereby the at least one metering orifice piston is shiftable from the closed central position in opposite shifting directions to continuously open a flow cross section between the first terminal and one or more of the second working terminals independent of the shifting direction, wherein the flow cross-section of at least one of the two throttles of the pressure dividing circuit is continuously variable with the flow cross-section being adjusted to set the control pressure so that the cross-section of the variable metering orifices is varied in response to the pressure at the first terminal, and the control chamber is connected to each of the second working terminals through branch conduits, each branch conduit branching to one of the second working terminals and being in fluid communication with the continuously variable throttle and one of the variable metering orifices.

2. A metering orifice arrangement according to claim 1, wherein the other one of the two throttles of the pressure dividing circuit is a fixed throttle disposed in a control oil flow path between the first terminal and a pilot valve.

3. A metering orifice arrangement according to claim 2, wherein a control passage, in which the fixed throttle is disposed and which opens into the control chamber, passes through the at least one metering orifice piston.

4. A metering orifice arrangement according to claim 1, wherein the at least one metering orifice piston is guided in a metering orifice sleeve in which windows defining the plurality of metering orifices are allocated to each of the second working terminals and arranged to be controlled to be opened by means of the metering orifice piston.

5. A metering orifice arrangement according to claim 4, wherein the windows have different cross-sections.

6. A metering orifice arrangement according to claim 1, wherein the at least one metering orifice piston includes two control edges, a dividing control edge which is active during current dividing and an adding control edge which is active during current adding.

7. A metering orifice arrangement according to claim 6, wherein the adding control edge is formed by an annular groove of the at least one metering orifice piston.

8. A metering orifice arrangement according to claim 7, wherein at the front in the at least one metering orifice piston a plurality of axial bores opening into the annular groove are formed.

9. A metering orifice arrangement according to claim 1, wherein the continuously variable throttle forms a pilot valve that is proportionally or stepwise adjustable.

10. A metering orifice arrangement according to claim 1, wherein the centering spring arrangement acts upon a shoulder of the at least one metering orifice piston via a cup-shaped spring plate, wherein the spring plate includes a shroud forming a receiving chamber for an end portion of a centering spring of the centering spring arrangement, the receiving chamber being connected to the control chamber via at least one shroud bore.

11. A metering orifice arrangement according to claim 1, wherein a pilot valve axis extends at right angles to a metering orifice sleeve axis and intersects the same.

12. A metering orifice arrangement according to claim 11, wherein a metering orifice sleeve at its outer circumference includes an oblong hole into which a torsion protection immerses, the torsion protection being disposed coaxially with respect to the pilot valve.

13. A metering orifice arrangement according to claim 1, wherein the flow cross-section of the continuously variable throttle is adjusted by supply of a current to a proportional magnet to vary oil flow through the adjustable pressure dividing circuit.

14. A metering orifice arrangement for a hydraulic current divider and current adding device comprising:

at least one metering orifice piston, each piston controlling one or more of a plurality of variable metering orifices, the variable metering orifices being located in parallel to each other for each flow direction, each of the metering orifices being arranged between a common first terminal and second working terminals, including separated interfaces, at a consumer side for a plurality of consumers, wherein a pressure prevailing in the first terminal is applied to the at least one metering orifice piston in a first direction, an adjustable pressure dividing circuit between the first terminal and the second working terminals, the adjustable pressure dividing circuit including at least two throttles for generating a control pressure lying between the pressure prevailing in the first terminal and a pressure prevailing in the second working terminals, the control pressure being applied to the at least one metering orifice piston through a control chamber in a second direction that is opposed to the first direction, and a centering spring arrangement by which the at least one metering orifice piston is centered in a central position such that the metering orifices are closed, wherein the flow cross-section of at least one of the two throttles of the pressure dividing circuit is continuously variable with the flow cross-section being adjusted to set the control pressure so that the cross-section of the variable metering orifices is varied in response to the pressure at the first terminal, and the control chamber is connected to each of the second working terminals through branch conduits, each branch conduit branching to one of the second working terminals and being in fluid communication with the continuously variable throttle and one of the variable metering orifices, the at least one metering orifice piston is guided in a metering orifice sleeve in which windows defining the plurality of metering orifices are allocated to each of the second working terminals and arranged to be controlled to be opened by means of the metering orifice piston, the metering orifice sleeve is slidingly inserted in a valve bore of a mobile control block and is biased into a home position, and at least one discharge passage connected to the second working terminals opens into the valve bore, which discharge passage is covered in the home position by an end portion of the metering orifice sleeve including at least one window, an end face of the metering orifice sleeve confining a spring chamber formed by the control chamber to which the control pressure can be applied so that the metering orifice sleeve is biased into a home position when the control pressure is applied and, when the control pressure is reduced, can be shifted from said home position into a free- running position in which the at least one discharge passage is controlled to be opened by the end portion of the metering orifice sleeve and are thus interconnected.

15. A metering orifice arrangement according to claim 14, wherein the axial stroke of the metering orifice sleeve is blocked by screwing in a screw plug.

* * * * *